United States Patent
Tian et al.

(10) Patent No.: US 11,279,849 B2
(45) Date of Patent: Mar. 22, 2022

(54) DEODORIZED ROSIN ESTER AND METHODS FOR MAKING

(71) Applicant: Kraton Polymers LLC, Houston, TX (US)

(72) Inventors: Jason Tian, Houston, TX (US); Ruidong Ding, Houston, TX (US); Chad Reiter, Savannah, GA (US)

(73) Assignee: KRATON POLYMERS LLC, Houston, TX (US)

( * ) Notice: Subject to any disclaimer, the term of this patent is extended or adjusted under 35 U.S.C. 154(b) by 0 days.

(21) Appl. No.: 15/929,780

(22) Filed: May 21, 2020

(65) Prior Publication Data

US 2021/0363385 A1 Nov. 25, 2021

(51) Int. Cl.
| | | |
|---|---|---|
| C09F 1/04 | (2006.01) | |
| C09F 1/02 | (2006.01) | |
| B01J 20/10 | (2006.01) | |
| B01J 20/34 | (2006.01) | |
| B01J 20/28 | (2006.01) | |

(52) U.S. Cl.
CPC .............. *C09F 1/04* (2013.01); *B01J 20/103* (2013.01); *B01J 20/28061* (2013.01); *B01J 20/28076* (2013.01); *B01J 20/28083* (2013.01); *B01J 20/3433* (2013.01); *C09F 1/02* (2013.01)

(58) Field of Classification Search
CPC ...... C09F 1/04; B01J 20/103; B01J 20/28061; B01J 20/28076; B01J 20/28083
See application file for complete search history.

(56) References Cited

U.S. PATENT DOCUMENTS

| | | | |
|---|---|---|---|
| 2,317,797 A | 4/1943 | Oliver et al. | |
| 2,846,429 A | 8/1958 | Howard | |
| 3,489,740 A | 1/1970 | Cholet et al. | |
| 4,822,526 A | 4/1989 | Tsuchida et al. | |
| 5,969,092 A | 10/1999 | Karvo | |
| 6,248,230 B1 | 6/2001 | Min et al. | |
| 11,041,095 B2* | 6/2021 | Ding | B01J 20/103 |
| 2002/0091233 A1* | 7/2002 | Gaudl | C09D 11/08 |
| | | | 530/200 |
| 2002/0183201 A1* | 12/2002 | Barnwell | B01J 20/18 |
| | | | 502/415 |
| 2004/0161389 A1 | 8/2004 | Gallis et al. | |
| 2007/0049727 A1 | 3/2007 | Pollock et al. | |

FOREIGN PATENT DOCUMENTS

| | | |
|---|---|---|
| EP | 3064558 A1 | 9/2016 |
| EP | 3064558 B1 | 3/2020 |
| JP | 2008031362 A | 2/2008 |
| WO | 2015/048426 A2 | 4/2015 |
| WO | 2015048426 A2 | 4/2015 |
| WO | 2016109206 A2 | 7/2016 |

OTHER PUBLICATIONS

Evdokimov, et al., "Desulfurization of black liquor soap for production of crude tall oil with lower sulfur content", 51 Wood Sci Technol, 2017, 1353.
Iler, "The Chemistry of Silica", 1979, 622-656.
Wang, et al., "Study of adsorption Characteristics in Silica gel-water adsorption refrigeration", 113 Applied Energy, 2014, 734.

* cited by examiner

Primary Examiner — Nicholas E Hill

(57) ABSTRACT

A process for deodorizing a rosin ester composition is disclosed. The process employs an adsorptive bed containing an adsorbent material. The adsorbent material comprises silica adsorbent having an average pore size between 50-200 Å, BET surface area of at least 300 m$^2$/g, pore volume of 1.20 to 3.00 cc/g, and a silanol [Si—OH] level of 0.5 to 5 unit/nm$^2$. The deodorized rosin ester composition has an odor intensity reduction of at least 1 unit on odor intensity scale of Offensive Odor Control Act as compared to the rosin ester feedstock. In embodiment, the deodorizing treatment comprises using multi-staged adsorbent system with an adsorbent column having multiple layers of different adsorbent materials.

18 Claims, No Drawings

US 11,279,849 B2

DEODORIZED ROSIN ESTER AND METHODS FOR MAKING

RELATED APPLICATIONS

This application claims benefit to U.S. provisional application Ser. 62/851,373 with a filing date of May 22, 2019, the entire disclosure is incorporated herein by reference.

FIELD

The invention relates to rosin ester compositions having a low odor level, as well as methods of using and making the same.

BACKGROUND

Economic and environmental considerations are forcing great market demand for renewable resources of raw materials, including those utilized for consumer products such as adhesives. The drive for more environmentally products will require more sustainable products such as rosin esters for use in adhesive applications, particularly rosin esters having lower odor level with improved color and stability, and lower sulfur levels.

Tall oil is obtained as a byproduct of the sulfate pulping process in the form of soap, which is acidified with sulfuric acid before distillation. As a result of the sulfate process, tall oil rosin also contains small amounts of various organic sulfur compounds (total sulfur approx. 1000 ppm), which are considered to give tall oil rosin its typical, somewhat unpleasant odor, clearly distinguishable from that of, for example, gum rosin. Tall oil derivatives such as rosin esters can be used in hot-melt adhesives for hygiene products and food packaging products, and also the use of glycerol esters of rosin as the binding agent in chewing gum mixes.

U.S. Pat. No. 5,969,092 discloses a process for the preparation of a tall oil rosin ester with a low odor level. The rosin ester product obtained from the esterification is subjected to evaporation to remove odor components and other volatile components from the product. The evaporation is carried out in a short-path evaporator having an evaporation surface and in its vicinity a condenser on which the removed vaporized components condense. A tall oil rosin ester with a low odor level is subsequently recovered from the evaporator.

There is still a need for improved methods to remove odor from tall oil rosin ester compositions.

SUMMARY OF THE INVENTION

In one aspect, a process for deodorizing a rosin ester composition is disclosed. The process comprises: providing a rosin ester feedstock in a liquid form having a viscosity in a range of 5-150 cPs, and subjecting the rosin ester feedstock to a deodorizing treatment using an adsorbent bed containing an adsorbent material for a deodorized rosin ester composition. The adsorbent material comprises silica adsorbent having an average pore size between 50-200 Å, BET surface area of at least 300 m$^2$/g, pore volume of 1.20 to 3.00 cc/g, and a silanol [Si—OH] level of 0.5 to 5 unit/nm$^2$. The deodorized rosin ester composition has an odor intensity reduction of at least 1 unit on odor intensity scale of Offensive Odor Control Act as compared to the rosin ester feedstock.

DESCRIPTION

The following terms will be used throughout the specification.

"Odor intensity" refers to the strength of an odor, or sensation of the odor results from the interaction of volatile chemical substances with the olfactory system. Odor intensity can be expressed by an odor intensity scale with a numerical value as under the Offensive Odor Control Act of Japan revised in 1995: 0 (no odor), 1 (barely perceivable odor), 2 (weak but barely discernible odor), 3 (easily discernible odor), 4 (rather strong), 5 (intense). For example, concentrations at the odor intensity grade 5 indicating intense odor are: 40 ppm with ammonia, 8 ppm with hydrogen sulfide, 0.2 ppm with methyl mercaptan, 1.9 ppm with acetic acid, and 10 ppm with acetaldehyde. Odor intensity assessment can be carried out by a panel of organoleptically trained experts.

"Tall oil" refers to a byproduct of the Kraft process of wood pulp manufacture. Tall oil contains generally both saturated and unsaturated terpenoid oxygen-containing organic compounds such as rosins, sterols (such as beta-sitosterol), rosin acids (mainly abietic acid and its isomers, dehydroabietic acid, and pimaric acid and its isomers), sterols, and terpenols. Tall oil also contains fatty acids (mainly linoleic acid, oleic acid and linolenic acid), fatty alcohols, as well as minor amounts of inorganic impurities and some residual lignin fragments.

The disclosure provides a method for deodorizing rosin esters, particularly tall oil rosin esters. The method also provides a low odor rosin ester with a low sulfur content with improved color stability and a low color. The deodorization is by adsorption with packing adsorbent materials. Adsorption is the adhesion of atoms, ions or molecules from a liquid or dissolved solid onto a surface.

Feedstock for Deodorization: The feedstock is rosin ester prepared from rosins including gum rosin, wood rosin or tall oil rosin. In embodiments, the rosin is tall oil rosin.

In embodiments to obtain a rosin ester feedstock in a liquid form, the rosin is subject to thermal reaction with an alcohol as disclosed in U.S. Pat. No. 4,822,526, incorporated by reference. In embodiments, the alcohol is a $C_{1-10}$ monohydric alcohol. Use of an alcohol having more than 10 carbon atoms reduces the viscosity or flowability of the rosin ester compound.

In embodiments, the rosin ester obtained from an esterification step wherein a rosin is esterified with a polyol to form rosin ester. The polyol is selected from glycerol and pentaerythritol and mixtures thereof. The esterification is carried out in the presence of a catalyst, e.g., esterification catalysts such as p-toluene sulfonic acid, hypophosphorous acid, or certain commercial special catalysts such as Irganox 1425 or Irganox B551 (manufacturer Ciba-Geigy). Irganox 1425 is chemically calciumbis[monoethyl(3,5-di-tertiary butyl-4-hydroxybenzyl)phosphonate], and Irganox B551 is a mixture of the former and of Irganox 415 (4,4'-thiobis[2-(1,1-dimethylethyl)-5-methylphenol]) at a ratio of 1:1. The gum, wood, tall oil and other rosins may be subjected to other treatments prior to use in the esterification process.

In embodiments, the rosin material may be subjected to distillation, disproportionation, hydrogenation or polymerization, or some combination of these and/or other treatments, after or before esterification. In embodiment, rosin ester may be made in a method that includes a partial disproportion step, as disclosed in U.S. Pat. Nos. 3,423,389, 4,302,371 and 4,657,703 all herein incorporated by reference.

For the deodorization step, the rosin ester is provided in a liquid form having a sufficiently low viscosity to allow for low resistance flow through an adsorbent column, e.g., a viscosity in the range of 2-150 cPs, or less than 125 cPs, or less than 100 cPS, or >5 cPs, or >10 cPs. If the rosin ester is provided in a solid form, or a liquid form that is not easily flowable, then the rosin ester is dissolved or dispersed in a sufficient amount of solvent, e.g., in amounts of 20-70 wt. %, or 35-65 wt. %, or at least 35 wt. %, or 40-55 wt. % rosin ester (based on the total weight of rosin ester and solvent).

The selected solvent is a solvent that is polar or apolar, Suitable solvents include alcohols, ethers (e.g. diethyl ether, tetrahydrofuran (THF)), monoalkyl ethers and polyalkyl ethers of polyols (e.g. monoalkyl ethers of diglycol such as 1-methoxy-2-propanol), ketones (e.g. acetone), esters, tertiary amides (e.g. N,N-dimethyl formamide (DMF) and N-methyl-2-pyrrolidone (NMP)), aliphatic hydrocarbons and aromatic hydrocarbons (e.g. hexane, benzene, toluene, xylene, and naphtha).

In embodiments, the rosin ester is dissolved in a base solvent selected from any of hexanes, heptanes, petroleum ether, cyclohexane, dipentane, napthal, mineral spirits, toluene, pentane, or any mixture of the above. In embodiments, a polar solvent, e.g., ethanol, methanol, or ethyl acetate, in an amount of <5 wt. % is added to a base solvent to increase the ability of the rosin ester solution to flow. The rosin ester can be dissolved in the base solvent by mixing and/or with light heat, at a temperature not above the boiling point of the base solvent.

The rosin ester feedstock (where in liquid form or not) has an odor due to the presence of volatile components, including sulfur containing components such as sulfides, e.g., with an odor intensity grade of at least 2, or at least 3, or sometimes at least 4, on the odor intensity scale of Offensive Odor Control Act, depending on the initial amount of odor-causing species. In embodiments, the rosin ester feedstock has a neat Gardner color of at least 2.5, or at least 3.0.

Method for Deodorization: The method includes providing at least an adsorption column and packing adsorbent particles. In this disclosure, adsorbent may be used interchangeably with sorbent. In embodiments, the adsorbent particles are arranged in layers of different adsorbent types from outlet end to feed end. In other embodiments, multiple columns may be used, wherein each column only contains a single adsorbent type. In yet other embodiments, a combination of columns that contain a single adsorbent type and/or columns that contain layered particles of different adsorbent types are used. Additionally, a combination of columns operated in parallel may be used to reduce operating pressures, or a series-parallel column configuration may be used to improve yield.

The adsorbent bed can be any of fixed bed, moving bed, simulated moving bed, single-stage, multi-stage, or countercurrent system. Multiple adsorbent beds can be employed in series, employing the same or different sorbent materials, e.g., the first bed containing activated carbon and the second bed containing silica gel, etc. The deodorization efficiency may depend on factors including temperature of the bed, adsorption capacity of the bed, selectivity, durability and regenerability of the sorbent.

In embodiments, the rosin ester feedstock in the liquid form (dissolved in a solvent) is passed through an absorbent column, where the rosin ester feedstock is brought into contact with an adsorbent material in the absorbent column, at a controlled flow rate corresponding to a superficial velocity (V) value of at least 0.3 ft/hr, or at least 0.5 ft/hr, or at least 1 ft/hr, or from 1-4 ft/hr, or at least 5 ft/hr. The effluent liquid from the adsorbent bed is analyzed at regular intervals of time for total sulfur content. The passage of feedstock into the adsorbent bed is terminated when the content of the sulfur causing species reaches a certain predetermined level, which defines the adsorption cycle. In embodiments, the deodorizing treatment is terminated when the performance of the column deteriorates, with very little reduction in odor intensity of the treated feedstock.

The adsorbent particles comprise an inorganic silica in particle form. "Silica" refers to any of silica gels, fumed silicas, or precipitated silicas. The silica can be in a hydrogel or a xerogel form. The primary characteristics relate to surface area, pore volume, average pore size, average particle size, Si—OH (silanol) level, and the gel pH. Additional characteristics may include impurities level (as ppm).

A pore volume quality of the adsorbent particles represents the total interior volume of the particles. In embodiments, the pore volume (total) is at least 1.20 cc/g, or at least 1.30 cc/g, or at least 1.5 cc/g, or between 1.20 to 3.00 cc/g, or less than 5.0 cc/g based on the Barrett-Joyner-Halenda (BJH) pore volume measurement technique. Total pore volume is given by the sum of the pore volumes of all adsorbent particles over the entire pore size range present in the adsorbent sample.

In embodiments, the adsorbent particles can be further characterized by pore size, i.e., pore diameter. Usually, adsorbent silica materials that provide a mesoporous surface, or a combination of mesoporous and microporous surfaces can be used. The selected pore size depends on various factors, such as the particular type of silica used, the specific type of oil being treated, the impurities initially present in the oil, the size and wetting characteristics of the impurities, and/or the chemical nature of the impurities, e.g., whether such impurities are polar or non-polar. In embodiments, the adsorbent materials have an average pore size of at least 50 Å, or at least 75 Å, or at least 90 Å, or at least 100 Å, or between 50-200 Å.

The average particle size (diameter) of the silica particles is usually in the range of 10 to 500 µm, or at least 75 µm, or at least 30 µm, or at least 50 µm, or at least 100 µm, depending on the commercial grade of the silica. Generally, a total surface area of the silica adsorbent particles is at least 300 m$^2$/g, or at last 400 m$^2$/g, or at least 500 m$^2$/g, or between 300 to 1000 m$^2$/g, based on the Brunauer-Em-mett-Teller (BET) measurement technique.

In embodiments, the absorbent silica gel is characterized as having a silanol [Si—OH] level of 0.5 to 5 unit/nm$^2$, or at least 1 unit/nm$^2$, or less than 5 unit/nm$^2$.

In embodiments, the adsorbent silica gel has a pH of less than 9, or less than 8, or less than 7, or between 6 and 8.

In embodiments, the adsorbent silica gel is characterized as having an equilibrium sulfur loading capacity of at least 1 mg S/g of adsorbent (for a specification of less than 10 ppm), or at least 2 mg S/g of adsorbent, at least 3 mg S/g of adsorbent, or at least 10 mg S/g of adsorbent, or at least 15 mg S/g of adsorbent, or in a range of 5-20 mg S/g of adsorbent.

In embodiments, the untreated rosin ester is passed through two deodorization treatments in series, one for contact with silica gel, and one for contact with activated carbon as adsorbent. The treatment can be with two separate columns in series, or a single column with layers of different adsorbents, e.g., a silica gel layer, then an activated carbon layer, with the silica gel treatment being either before or after the activated carbon treatment.

Optional Heat Treatment: In embodiments, heat treatment can be carried out on the rosin ester feedstock in the liquid form as a preliminary step to convert the odor bodies (i.e., the sulfur compounds) and color and into a form that can be separated in the treatment steps. When heated, some of the sulfur compounds are converted to heavier materials with lower volatility that would facilitate removal in a subsequent distillation step, or for easier adsorption/removal in the deodorization step. Heating can also cause removal by evaporation of sulfur compounds having a relatively high volatility or decompose sulfur compounds into more volatile derivatives and thereby lead to a reduced sulfur content of the remaining material. In embodiments, heating is conducted under conditions with a relatively low oxygen concentration such as in an inert atmosphere like in a nitrogen atmosphere or in vacuum.

In embodiments, the heat treatment is carried out for a sufficient amount of time and at a sufficient temperature, e.g., at least 150° C. and for at last 1 hrs. in an inert environment (e.g., substantially free of oxygen or other reactive air), at least 200° C. and for at least 5 hours, or at least 250° C. for at least 5 hours, or from 250 to 300° C. for 1-4 hours.

Optional/Additional Adsorption Steps to Remove Odor: In embodiments depending on the interaction mechanism between the odor causing compounds, e.g., sulfur species, and sorbents, additional adsorption can be employed to the deodorization step with any of: (i) adsorptive deodorization, (ii) reactive adsorption, and (iii) combinations.

In embodiments, the additional adsorption step comprises using activated carbon as adsorbents. High surface areas can be obtained using either physical or chemical activation, with combined treatments to enhance the surface properties of the adsorbent, therefore increasing its adsorption capacity to end up with similar values as commercially available activated carbon.

In other embodiments, the additional adsorption step is with sorbents such as alumina, zeolites, molecular sieve, clay, activated clay, etc., at a temperature of less than 150° C. An example is a sorbent bed comprising activated carbon and zeolite, e.g., or a two-bed combination with a first bed containing activated carbon at a temperature of at least 60° C., and the second bed containing zeolite, or a single-sorbent bed containing activated carbon.

Adsorbent Regeneration: After the adsorbent has been used up to their capacity, there is a deterioration in performance, i.e., in the removal of odor. Regeneration of the loaded or spent mesoporous adsorbent can start by first blowing nitrogen through the column to remove residual rosin ester in the liquid form, then by counter-currently flowing through the adsorbent bed, a polar solvent such as methanol, ethanol, acetone or any other solvent or mixture of solvents as may be found suitable for the purpose. In one embodiment, the solvent is water. Lastly, with the removal of solvent by blow/drying with an inert gas like nitrogen.

In the regeneration process, effluent from the adsorbent bed during the regeneration cycle is analyzed for concentration of the odor causing species, e.g., aldehydes, sulfur species, etc., at regular intervals of time and countercurrent flow of polar solvent (regenerant) is terminated when the total sulfur content drops to below detection limits. This defines the regeneration cycle of the process. In embodiments, the regeneration of the adsorbent is as disclosed in U.S. Pat. No. 6,248,683B1, incorporated herein by reference.

Recovery of Deodorized Rosin Ester: The treated rosin ester after deodorization is recovered by methods known in the art, for the removal of the solvent, e.g., by distillation, or using a wiped film evaporator, or a short-path evaporator, with the temperature of the evaporation surface at 125° C. to 280° C., or less than 250° C., or less than 200° C.

Properties of The Deodorized Rosin Ester Composition: The deodorized rosin ester is characterized as having a reduced odor intensity and ameliorated odor hedonic tone properties. Odor hedonic tone refers to the degree of pleasantness of an odor. In embodiments, the deodorized rosin ester has a reduction in odor intensity of at least is at least 1 units, or at least 2 units, or at least 3 units, or at least 4 units on the odor intensity scale of 0 to 5 (according to the Offensive Odor Control Act scale) compared to the untreated rosin ester.

In addition to the odor reduction, the rosin ester is also characterized as having improved or lighter color, with the treated rosin ester having a Gardner color of less than 3.0, or less than 2.5, or a reduction in color of at least 1 Gardner unit compared to the untreated rosin ester.

Applications: The rosin ester composition with a reduced odor ("deodorized rosin ester") can be used as in a variety of applications, including as adhesives (e.g., hot-melt adhesives), inks, coatings, rubbers, sealants, asphalt, and thermoplastic road markings and pavement markings. In embodiments, the compositions are hot-melt adhesives used, for example, in conjunction with papers and packaging (e.g., to adhere surfaces of corrugated fiberboard boxes and paperboard cartons during assembly and/or packaging, to prepare self-adhesive labels, to apply labels to packaging, or in other applications such as bookbinding). In embodiments, the rosin ester is used in conjunction with non-woven materials (e.g., to adhere nonwoven material with a backsheet during the construction of disposable diapers), in adhesive tapes, in apparel (e.g., in the assembly of footwear, or in the assembly of multi-wall and specialty handbags). In other embodiments, the deodorized rosin ester is used in electrical and electronic bonding (e.g., to affix parts or wires in electronic devices), in general wood assembly (e.g., in furniture assembly, or in the assembly of doors and mill work), and in other industrial assembly (e.g., in the assembly of appliances).

The deodorized rosin ester can also be used in a variety of additional applications, including as a softener and plasticizer in chewing gum bases, as a weighting and clouding agent in beverages (e.g., citrus flavored beverages). In embodiments, the deodorized rosin ester can be used as a surfactant, surface activity modulator, or dispersing agent, as an additive in waxes and wax-based polishes, as a modifier in cosmetic formulations (e.g., mascara), and as a curing agent in concrete.

Examples: The following examples are intended to be non-limiting.

In the examples, Rosin Ester 1 is a stabilized pentaerythritol ester of tall oil rosin having a softening point (Tsp) of 96-102° C., a Gardner color of 4-, acid number mg KOH/g of 10, a glass transition temperature Tg of 48° C., a Brookfield viscosity at 125° C. of 11,800 cps. The starting odor intensity is 4.

Rosin Ester 2 is also a pentaerythritol ester of tall oil rosin made in an esterification process with excess amounts of rosin, and with the use of phenol sulfide as a disproportionation catalyst. The rosin ester a softening point (Tsp) of 99-105° C., a Gardner color of 0.6-1.0, acid number mg KOH/g of 6, a glass transition temperature Tg of 54° C., a Brookfield viscosity at 125° C. of 19,343 cps. The starting odor intensity is 3.

The granulated carbon used in the Examples is a high pore volume activated carbon having a mean particle diameter of 0.9 to 1.1 nm, an iodine number of 1020 (min) mg/g, 12 US Mesh [1.70], 5 (max) wt. %, and 4.0 (max)<40 US Mesh [0.425 mm] (PAN).

The powdered carbon used in the Examples is also an activated carbon having an apparent density AD of 0.30 g/cc, an iodine number of 1000 (min) mg/g, and −325 Mesh.

Properties of the adsorbents used in the Examples are shown in Table 1.

TABLE 1

| Adsorbent Material | SA $m^2/g$ | PV $cc/g$ | Pore Size Å | Particle size Malvern d50 μm | [Si—OH] unit/$nm^2$ | Gel pH |
|---|---|---|---|---|---|---|
| 167 | 920 | 2.38 | 104 | 100 | 4.5 | <7 |
| 169 | 822 | 1.96 | 95 | 100 | 1.0 | <7 |

Example 1: A rosin ester solution was made using 300 grams of Rosin Ester 1 into 300 grams of heptane. This solution was passed through a fixed bed 2.25" diameter 9" length column packed with 132 grams of silica adsorbent 167 at a pressure of 40 psig. inlet. The total sample was treated over a 30 min period at a continuous flow, after which the column was rinsed with the base solvent. The column was rinsed with the base solvent for two volumes or 1 litter of solvent. The absorbent was stripped using a polar solvent of methanol/ethanol in a 50:50 mix. The rinse product from the polar solvent strip came off the column as a white/yellow paste that was insoluble in the solvent.

Solvent was removed from the treated product via Roto-Vap and Vacuum oven. Table 2 compares the final treated rosin ester with the starting material.

TABLE 2

| Test | Starting material | Treated material |
|---|---|---|
| Color Gardner | 3.6 | 2.0 |
| Softening Point ° C. | 98.6 | 91.0 |
| Acid value mgKOH/g | 9.6 | 9.2 |
| Odor intensity | 4 | 2 |

Example 2: A solution of 400 grams was made using equal parts or petroleum ether and Rosin Ester 2. This solution was passed through two columns of silica (as in Example 1), with the first column containing 118 grams of silica adsorbent 167, and the second containing 130 grams of silica adsorbent 169. Product was collected and the solvent removed by Roto-Vap and Vacuum oven.

Solvent was removed from the treated product via Roto-Vap and Vacuum oven. The final product has a reduction in odor intensity of at least 1 units to 1-2, and a color reduction to a Gardner color of ~0.

Example 3. A solution of 3 kg. of Rosin Ester 1 with equal parts hexanes was made. This solution was passed through three fixed bed columns (with sizes similar to Example 1). The first column had 101.2 g. of the powdered carbon and 78.3 g. of the granulated carbon. The second column contained 131 g. of silica adsorbent 167. The final column had 142 g. of silica adsorbent 169. Two samples of treated products were collected, and the solvent removed by Roto-Vap and Vacuum oven. Results are shown in Table 3.

TABLE 3

| Test | Starting Material | Sample #1 | Sample #2 |
|---|---|---|---|
| Color Gardner | 3.2 | 1.9 | 1.8 |
| Softening Point ° C. | 99.3 | 97.8 | 100.6 |
| Acid Value mgKOH/g | 13.4 | 12.9 | 13.0 |
| Odor intensity | 4 | 2 | 1 |

Example 4. A solution 1400 g. solution of Rosin Ester 1 in equal parts to hexanes was provided. The solution was then passed through a total of three columns. Column one contained 81.4 g. of granulated carbon and 102.3 g. of powder carbon column. Column two contained 116.5 g of silica adsorbent 169. The final column had 96.5 g of silica adsorbent 167. The columns were feed at a rate of 15 ml/min and an inlet pressure of 60 psig. Once the treated product was collected, 1.3 g. of an antioxidant package was added to the solution and this product was Roto-Vaped down to 200 millbar at 80° C. The product from the Roto-Vap was then transferred to a vacuum oven set at 225° C. at a vacuum of 30 in/mg for one hour. Results are shown in Table 4.

TABLE 4

| Test | Treated Sample |
|---|---|
| Color Gardner | 2.2 |
| Softening Point ° C. | 98.5 |
| Acid Value mgKOH/g | 8.9 |
| Odor intensity | 1 |

Example 5. A solution of 1400 g. Rosin Ester 1 was made in equal parts solids to hexanes by weight. The solution was then passed through a total of three columns. Column one contained 81.4 g. of granulated carbon and 102.3 g. of powder carbon. Column two contained 116.5 g of silica adsorbent 169. The final column had 96.5 g of silica adsorbent 167. The columns were feed at a rate of 15 ml/min and an inlet pressure of 60 psig.

Once the treated product was collected, 1.3 g. of an antioxidant package was added to the solution and this product was Roto-Vaped down to 200 millbar at 80° C. The product from the Roto-Vap was then transferred to a vacuum oven set at 225° C. at a vacuum of 30 in/mg for one hour. Results are shown in Table 5.

TABLE 5

| Test | Treated Sample |
|---|---|
| Color Gardner | 2.5 |
| Softening Point ° C. | 98.5 |
| Acid Value mgKOH/g | 10.3 |
| Odor intensity | 1 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A process for deodorizing a rosin ester composition, the process comprising:
    providing a rosin ester feedstock in a liquid form by dissolving a solid rosin ester in a solvent, the rosin ester feedstock having a viscosity in a range of 5-150 cPs, an initial color, and an odor intensity;
    contacting the rosin ester feedstock with an adsorbent material in an adsorbent bed, obtaining a deodorized rosin ester composition;
        wherein the solvent is present in the rosin ester feedstock in an amount of at least 35 wt. % based on the total weight of the rosin ester feedstock;
        wherein the adsorbent bed is operated at an adsorption temperature of 20-30° C., and at one bar pressure;
        wherein the adsorbent material comprises silica adsorbent having an average pore size between 50-200 Å, BET surface area of at least 300 m$^2$/g, pore volume of 1.20 to 3.00 cc/g, and a silanol [Si—OH] level of 0.5 to 5 unit/nm$^2$; and
    wherein the deodorized rosin ester composition has an odor intensity reduction of at least 1 unit on odor intensity scale of Offensive Odor Control Act as compared to the rosin ester feedstock.

2. The process of claim 1, wherein the deodorized rosin ester composition has an odor intensity reduction of at least 2 units as compared to the rosin ester feedstock.

3. The process of claim 2, wherein the deodorized rosin ester composition has an odor intensity reduction of at least 3 units as compared to the rosin ester feedstock.

4. The process of claim 1, wherein the adsorbent bed is operated at a superficial velocity (V) of at least 0.3 ft/hr.

5. The process of claim 4, wherein the adsorbent bed is operated at a superficial velocity (V) of at least 1 ft/hr.

6. The process of claim 1, wherein the deodorized rosin ester composition has a reduction in color of at least 1 Gardner number as compared to the initial color of the rosin ester feedstock.

7. The process of claim 6, wherein the deodorized rosin ester composition has a reduction in color of at least 2 Gardner numbers.

8. The process of claim 1, wherein 35-65 wt. % of the solid rosin ester is dissolved in the solvent, based on the total weight of the rosin ester and the solvent.

9. The process of claim 8, further comprising recovering the deodorized rosin ester by evaporating the solvent.

10. The process of claim 1, wherein 40-55 wt. % of the solid rosin ester is dissolved in the solvent, based on the total weight of the rosin ester and the solvent.

11. The process of claim 1, wherein the solvent is selected from alcohols, ethers, ketones, esters, tertiary amides, aliphatic hydrocarbons, aromatic hydrocarbons, and mixtures thereof.

12. The process of claim 1, wherein the solvent is selected from hexanes, heptanes, petroleum ether, cyclohexane, dipentane, napthal, mineral spirits, toluene, pentane, and mixtures thereof.

13. The process of claim 1, further comprising
    collecting the adsorbent material, and
    passing a solvent over the adsorbent material in the adsorbent bed, for a sufficient period of time, to dissolve odor causing species and regenerate the adsorbent material.

14. The process of claim 13, wherein the solvent used for regenerating the adsorbent material is selected from methanol, ethanol, acetone and mixtures thereof.

15. The process of claim 1, wherein the adsorbent bed comprises a multi-stage adsorbent column having at least two layers, each layer with a different adsorbent material.

16. The process of claim 1, wherein the adsorbent bed comprises at least two different adsorbent columns, with each adsorbent column containing different adsorbent material.

17. A process for deodorizing a rosin ester composition, the process comprising:
    providing a rosin ester feedstock in a liquid form by dissolving a solid rosin ester in a solvent, the rosin ester feedstock having a viscosity in a range of 5-150 cPs;
    contacting the rosin ester feedstock with two adsorbent beds in series, a first adsorbent bed containing a first adsorbent material and a second adsorbent bed containing a second adsorbent material, obtaining a deodorized rosin ester composition,
    wherein the first adsorbent material and the second adsorbent material are different,
    wherein at least one of the first adsorbent material and the second adsorbent material is a silica adsorbent having an average pore size between 50-200 Å, a BET surface area of at least 300 m$^2$/g, pore volume of 1.20 to 3.00 cc/g, and a silanol [Si—OH] level of 0.5 to 5 unit/nm$^2$;
    wherein the solvent is present in the rosin ester feedstock in an amount of at least 30 wt. % based on the total weight of the rosin ester feedstock;
    wherein at least one of the adsorbent beds is operated at an adsorption temperature of 20-30° C., and at one bar pressure; and
    wherein the deodorized rosin ester composition has an odor intensity reduction of at least 2 units on odor intensity scale of Offensive Odor Control Act as compared to the rosin ester feedstock.

18. The process of claim 17, wherein the first adsorbent bed and the second adsorbent bed are in a single adsorption column having different layers of adsorbent materials.

* * * * *